(12) United States Patent
Schneider

(10) Patent No.: US 8,588,412 B2
(45) Date of Patent: Nov. 19, 2013

(54) MECHANISM FOR GENERATING PSEUDORANDOM NUMBER SEQUENCES

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 432 days.

(21) Appl. No.: 12/154,465

(22) Filed: May 23, 2008

(65) Prior Publication Data

US 2009/0292752 A1 Nov. 26, 2009

(51) Int. Cl.
*H04L 29/06* (2006.01)

(52) U.S. Cl.
USPC .............................. 380/46; 708/250

(58) Field of Classification Search
USPC ............................ 380/46; 708/250
See application file for complete search history.

(56) References Cited

U.S. PATENT DOCUMENTS

| | | | |
|---|---|---|---|
| 4,157,454 A | 6/1979 | Becker | |
| 5,003,597 A | 3/1991 | Merkle | |
| 5,009,597 A | 4/1991 | Macy et al. | |
| 5,214,703 A | 5/1993 | Massey et al. | |
| 5,361,323 A | 11/1994 | Murata et al. | |
| 5,619,576 A | 4/1997 | Shaw | |
| 5,724,428 A | 3/1998 | Rivest | |
| 5,799,088 A | 8/1998 | Raike | |
| 6,061,449 A | 5/2000 | Candelore et al. | |
| 6,122,379 A | 9/2000 | Barbir | |
| 6,247,112 B1 | 6/2001 | Seki | |
| 6,523,114 B1 | 2/2003 | Barton | |
| 6,560,338 B1 | 5/2003 | Rose et al. | |
| 6,999,588 B1 | 2/2006 | Oishi | |
| 7,103,181 B2 | 9/2006 | Ananth | |
| 7,263,540 B1 | 8/2007 | Kuehnel | |
| 7,328,228 B2 | 2/2008 | Klein et al. | |
| 7,795,899 B1 | 9/2010 | Grohoski et al. | |
| 7,925,009 B2 | 4/2011 | Schneider | |
| 7,945,049 B2 | 5/2011 | Schneider | |
| 7,962,540 B2 | 6/2011 | Michaels et al. | |
| 8,265,272 B2 | 9/2012 | Schneider | |
| 8,358,781 B2 | 1/2013 | Schneider | |
| 8,416,947 B2 | 4/2013 | Schneider | |
| 2001/0029608 A1 | 10/2001 | Nagashima et al. | |
| 2001/0033656 A1 | 10/2001 | Gligor et al. | |
| 2002/0054679 A1 | 5/2002 | Vesely | |
| 2002/0124033 A1 | 9/2002 | Takahashi | |
| 2002/0136406 A1 | 9/2002 | Fitzhardinge et al. | |
| 2003/0048728 A1 | 3/2003 | Kuribayashi et al. | |
| 2003/0048899 A1 | 3/2003 | Spacey | |
| 2003/0059040 A1* | 3/2003 | Rose et al. ................ 380/1 |
| 2003/0217268 A1 | 11/2003 | Gantman | |
| 2004/0120518 A1 | 6/2004 | Macy et al. | |
| 2004/0215686 A1 | 10/2004 | Yoon et al. | |

(Continued)

OTHER PUBLICATIONS

Tan. "The PLFG parallel pseudorandom number generator" Feb. 2002 pp. 693-698. Future generation computer systems vol. 18 issue 5.*

(Continued)

*Primary Examiner* — Lisa Lewis
(74) *Attorney, Agent, or Firm* — Lowenstein Sandler LLP

(57) ABSTRACT

In one embodiment, a mechanism for generating pseudorandom number sequences is disclosed. In one embodiment, a method includes receiving seed values for a pseudorandom number generator (PRNG) in a computing system, the seed values being polynomials. The method further includes running the PRNG using the seed values as initialization parameters, the running including performing operations of the PRNG over $GF(2^n)$, and generating a sequence of pseudorandom numbers.

21 Claims, 4 Drawing Sheets

(56) References Cited

U.S. PATENT DOCUMENTS

| | | | |
|---|---|---|---|
| 2005/0065955 | A1 | 3/2005 | Babikov et al. |
| 2005/0097153 | A1 | 5/2005 | Dirscherl et al. |
| 2005/0131961 | A1 | 6/2005 | Margolus |
| 2005/0177727 | A1 | 8/2005 | Moskowitz et al. |
| 2005/0246215 | A1 | 11/2005 | Rackham |
| 2006/0126843 | A1 | 6/2006 | Brickell et al. |
| 2006/0129419 | A1 | 6/2006 | Flaxer et al. |
| 2006/0156187 | A1* | 7/2006 | Wu et al. .................. 714/759 |
| 2007/0076890 | A1 | 4/2007 | Muresan et al. |
| 2007/0237327 | A1 | 10/2007 | Taylor et al. |
| 2008/0069342 | A1 | 3/2008 | Relyea |
| 2008/0109501 | A1 | 5/2008 | Douguet et al. |
| 2008/0130876 | A1 | 6/2008 | Etienne et al. |
| 2008/0292096 | A1 | 11/2008 | Schneider |
| 2008/0298583 | A1* | 12/2008 | Ahmed ........................ 380/46 |
| 2008/0307024 | A1 | 12/2008 | Michaels et al. |
| 2009/0060179 | A1 | 3/2009 | Schneider |
| 2009/0060180 | A1 | 3/2009 | Schneider |
| 2009/0195370 | A1* | 8/2009 | Huffman et al. ......... 340/426.13 |
| 2009/0214024 | A1 | 8/2009 | Schneider |
| 2009/0220083 | A1 | 9/2009 | Schneider |
| 2009/0279690 | A1 | 11/2009 | Michaels et al. |
| 2009/0292751 | A1 | 11/2009 | Schneider |
| 2009/0292752 | A1 | 11/2009 | Schneider |
| 2010/0135486 | A1 | 6/2010 | Schneider |
| 2011/0213819 | A1 | 9/2011 | Douguet et al. |

OTHER PUBLICATIONS

Stein, "Visualizing Galois Fields", May 17, 2012, pp. 1-11 from http://nklein.com/2012/05/visualizing-galois-fields/.*
Entacher, Karl, "Appendix: Linear Recurrences", Jun. 16, 2012, pp. 1-3 from http://random.mat.sbg.ac.at/results/karl/server/node11.html.*
Applied Cryptography, 2nd Edition, Chapter 17, pp. 417-418.
Barker, William C., "Recommendation for the Triple Data Encryption Algorithm (TDEA) Block Cipher", National Institute of Standards and Technology, Technology Administration U.S. Department of Commerce, Information Security, NIST Special Publication 800-67, Version 1.1, Revised May 19, 2008, (May 2004), 40 pages.
Bauer, Friedrich L., "8. Transposition Ciphers", Decrypted Secrets, 2nd edition, (2000), 16 pages.
Belal, Ahmed A., et al., "2D-Encryption Mode" Mar. 2001, 32 pages.
Bellare, M., et al., "A Conventional Authenticated-Encryption Mode" Submission to National Institute of Standards and Technology, Apr. 13, 2003, 14 page.
Bellare, M., et al., "The FFX Mode of Operation for Format-Preserving Encryption" Feb. 20, 2010, pages.
Black, John, et al., "A Suggestion for handling Arbitrary-Length Messages with the CBC MAC", Aug. 2001, 3 pages.
"Blum Blum Shub" from Wikipedia, the free encyclopedia. http://en.wikipedia.org/wiki/Blum_Blum_Shub. Aug. 9, 2007, 2 pages.
Brier, Eric, et al., "BPS: a Format-Preserving Encryption Proposal" 11 pages, Ingenico, France. Published at the following website Apr. 2010, http://csrc.nist.gov/groups/ST/toolkit/BCM/modes_development.html.
Cohen, Bram, "AES-hash" May 2, 2001, 4 pages.
"Data Encryption Standard (DES)", FIPS PUB 46-2, Dec. 30, 1993, 16 pages, http://www.itl.nist.gov/fipspubs/fip46-2.htm.
"Data Encryption Standard (DES)", U.S. Department of Commerce/National Institute of Standards and Technology, FIPS PUB 46-3, Reaffirmed Oct. 25, 1999, (Oct. 25, 1999), 26 pages.
Dworkin, Morris, "Recommendation for Block Cipher Modes of Operation—Galois/Counter Mode (GCM) and GMAC" National Institute of Standards and Technology, Technology Administration U.S. Department of Commerce, Information Security, NIST Special Publication 800-38D, Nov. 2007, 39 pages.
Dworkin, Morris, "Recommendation for Block Cipher Modes of Operation—Methods and Techniques" National Institute of Standards and Technology, Technology Administration U.S. Department of Commerce, Information Security, NIST Special Publication 800-38A, 2001, 66 pages.
Dworkin, Morris, "Recommendation for Block Cipher Modes of Operation—The CCM Mode for Authentication and Confidentiality" National Institute of Standards and Technology, Technology Administration U.S. Department of Commerce, Information Security, NIST Special Publication 800-38C, May 2004, updated 2007, 27 pages.
Dworkin, Morris, "Recommendation for Block Cipher Modes of Operation—the CMAC Mode for Authentication" National Institute of Standards and Technology, Technology Administration U.S. Department of Commerce, Information Security, NIST Special Publication 800-38B, May 2005, 25 pages.
Dworkin, Morris, "Recommendation for Block Cipher Modes of Operation—the XTS-AES Mode for Confidentiality on Storage Devices" National Institute of Standards and Technology, Technology Administration U.S. Department of Commerce, Information Security, NIST Special Publication 800-38E, Jan. 2010, 12 pages.
"Finite Field" from Wikipedia, the free encyclopedia. http://en.wikipedia.org/wiki/Galois_field. Aug. 10, 2007, 5 pages.
Fischer, Viktor, "Realization of the Round 2 AES Candidates Using Altera FPGA", (2000), pp. 1-15.
Gligor, Virgil D., et al., "Fast Encryption and Authentication: XCBC Encryption and EXCB Authentication Modes" Mar. 30, 2001 (Apr. 20, 2001, revision), 64 pages, retrieved from http://csrc.nist.gov/groups/ST/toolkit/BCM/modes_development.html.
Gligor, Virgil D., et al., "On Message Integrity in Symmetric Encryption" Nov. 10, 2000, 41 pages. VDG Inc., Maryland.
Håstad, Johan, et al., "Key Feedback Mode: a Keystream Generator with Provable Security" Oct. 11, 2000, 23 pages, Stockholm, Sweden.
Hellstrom, Henrick, "Propagating Cipher Feedback mode" 2001, 4 pages.
Housely, Russ, et al., "Counter with CBC-MAC (CCM)—AES Mode of Operation" RSA Laboratories, Submission to National Institute of Standards and Technology, Jun. 3, 2002, 9 pages.
Iwata, Tetsu, et al., "OMAC: One-Key CBC MAC" Dec. 20, 2002, 32 pages.
Jaulmes, Antoine Joux, et al., "On the Security of Randomized CBC-MAC Beyond the Birthday Paradox Limit a New Construction" 2002, 15 pages, DCSSI Crypto Lab.
Jutla, Charanjit S., "Encryption Modes with Almost Free Message Integrity" IBM T.J. Watson Research Center, New York, 2001, 6 pages.
Jutla, Charanjit S., "Parallelizable Encryption Mode with Almost Free Message Integrity" IBM T.J. Watson Research Center, 2000, 23 pages.
Knudsen, Lars R., "Reports in Informatics—Block Chaining modes of operation" Oct. 2000, 16 pages, Report No. 207, Department of Informatics, University of Bergen, Bergen, Norway.
Kohno, Tadayoshi, et al., "The CWC Authenticated Encryption (Associated Data) Mode" May 27, 2003, 18 pages, Submission to National Institute of Standards and Technology.
Kurosawa, Kaoru, et al., "TMAC: Two-Key CBC MAC" Jun. 21, 2002, 18 pages.
Lipmaa, Helger, et al., "Comments to NIST concerning AES Modes of Operations:" CTR-Mode Encryption 2000, 4 pages.
Mattsson, Ulf T., "Format-Controlling Encryption using Datatype-Preserving Encryption" Jun. 30, 2009, 46 pages, Protegrity Corporation.
McGrew, David A., et al., The Galois/Counter Mode of Operation (GCM) Submission to National Institute of Standards and Technology, May 31, 2005, 44 pages.
Mirza, Fauzan, "Block Ciphers and Cryptanalysis" Mar. 1998, pp. 1-27.
Rogaway, Phillip, "PMAC—Proposal to NIST for a parallelizable message authentication code" Apr. 1, 2001, 27 pages.
Rogaway, Phillip, et al., "OCB: A Block-Cipher mode of operation for Efficient Authenticated Encryption" Aug. 3, 2001, 36 pages.
Rogaway, Phillip, et al., "The SIV Mode of Operation for Deterministic Authenticated-Encryption (Key Wrap) and Misuse-Resistant Nonce-Based Authenticated-Encryption" Aug. 20, 2007, 3 pages, retrieved from http://csrc.nist.gov/groups/ST/toolkit/BCM/modes_development.html.

(56) References Cited

OTHER PUBLICATIONS

Rose, Greg, "A Stream Cipher Based on Linear Feedback over GF(28)", Springer-Verlag Berlin Heidelberg, C. Boyd and E. Dawson: ACISP '98, LNCSI1438, (1998), pp. 135-145.
RSA, "What is Cipher Block Chaining Mode?" Mar. 3, 2007 from Internet Archive WayBack machine. http://web.archive.org/web/20070303121357/http://www.rsa.com/rsalabs/node.asp?id=2171.
Schroeppel, Richard C., et al., "Cipher-State (CS) Mode of Operation for AES" Sandia National Laboratories, Submission to National Institute of Standards and Technology, May 7, 2004, 8 pages.
Schneier, "Applied Cryptography", John Wiley and Sons, 2nd Edition, (1996), p. 319.
"Secure Cryptoprocessor" from Wikipedia, the free encyclopedia. http://en.wikipedia.org/wiki/Secure_cryptoprocessor. Aug. 10, 2007, 3 pages.
Shannon, C.E., "Communication Theory of Secrecy Systems" Bell System Techinical Journal, vol. 28, (4) 1949, pp. 656-715.
"Transposition cipher", Wikipedia, the free encyclopedia, http://en.wikipedia.org/wiki/Transposition_cipher, accessed May 8, 2007, 8 pages.
Wolfram Math World, Primitive Polynomials, http://mathworld.wolfram.com/primitivepolynomial.html, pp. 1-2, Feb. 9, 2006 from Internet Archive WayBack Machine.
Red Hat Notice of Allowance for U.S. Appl. No. 11/807,261 mailed Dec. 14, 2010.
Red Hat Office Action for U.S. Appl. No. 11/807,261 mailed Jul. 19, 2010.
Red Hat Office Action for U.S. Appl. No. 11/897,411 mailed Sep. 2, 2010.
Red Hat Office Action for U.S. Appl. No. 11/897,414 mailed Sep. 2, 2010.
Red Hat Office Action for U.S. Appl. No. 12/072,069 mailed Sep. 2, 2010.
Red Hat Office Action for U.S. Appl. No. 12/074,012 mailed Sep. 3, 2010.
Red Hat Office Action for U.S. Appl. No. 12/325,228 mailed Sep. 3, 2010.
U.S. Appl. No. 11/897,411, Final Office Action dated Jan. 5, 2011.
U.S. Appl. No. 11/897,414, Final Office Action dated Dec. 28, 2010.
U.S. Appl. No. 12/072,069, Final Office Action dated Jan. 5, 2011.
U.S. Appl. No. 12/074,012, Notice of Allowance dated Jan. 11, 2011.
U.S. Appl. No. 12/325,228, Final Office Action dated Feb. 4, 2011.
Schneier, "Applied Cryptography" 1996, John Wiley and Sons, 2nd Edition, p. 237.
Red Hat, Inc. Office Action for U.S. Appl. No. 11/807,261, mailed Feb. 28, 2011.
Red Hat, Inc. Notice of Allowance for U.S. Appl. No. 11/807,261, mailed Mar. 14, 2011.
Red Hat, Inc. Office Action for U.S. Appl. No. 12/072,069, mailed Apr. 29, 2011.
Red Hat, Inc. Non-Final Office Action for U.S. Appl. No. 11/897,411, mailed Aug. 26, 2011.
Red Hat, Inc. Non-Final Office Action for U.S. Appl. No. 12/072,069, mailed Oct. 3, 2011.
Red Hat, Inc. Final Office Action for U.S. Appl. No. 12/325,228, mailed Oct. 14, 2011.
McLauchlin, Apr. 6, 2007, "Random Number Generation for Cryptography," http://imps.mcmaster.ca/courses/SE-4C03-07/wiki/mclaucwj/Random_Number_Generation_for_Cryptography.html, pp. 103.
Red Hat Office Action for U.S. Appl. No. 11/897,411, mailed Dec. 21, 2011.
Red Hat Office Action for U.S. Appl. No. 11/897,414 Mailed Dec. 1, 2011.
Red Hat Office Action for U.S. Appl. No. 12/072,069, mailed Feb. 22, 2012.
Red Hat Notice of Allowance for U.S. Appl. No. 12/074,012 Mailed Jan. 11, 2011.
Red Hat Office Action for U.S. Appl. No. 12/125,833, mailed Dec. 9, 2011.
Red Hat Office Action for U.S. Appl. No. 12/125,833, mailed Mar. 16, 2012.
"Blum Blum Shub Generator" from httpws:www.cs.indiana.edu/~kapadia/project2/node11.html, 1 page May 30, 2011.
USPTO; Office Action for U.S. Appl. No. 11/897,411, mailed May 9, 2012.
USPTO; Notice of Allowance for U.S. Appl. No. 11/897,414 miled May 10, 2012.
USPTO; Office Action for U.S. Appl. No. 12/072,069, mailed Jun. 27, 2012.
USPTO; Office Action for U.S. Appl. No. 12/325,228, mailed Apr. 12, 2012.
USPTO; Office Action for U.S. Appl. No. 11/897,411, mailed Sep. 13, 2012.
USPTO; Notice of Allowance for U.S. Appl. No. 12/325,228, mailed Sep. 14, 2012.
USPTO, Office Action for U.S. Appl. No. 11/897,411, mailed Mar. 14, 2013.
USPTO, Notice of Allowance for U.S. Appl. No. 12/072,069, mailed Dec. 6, 2012.
USPTO, Office Action for U.S. Appl. No. 12/125,833, mailed Feb. 12, 2012.

\* cited by examiner $X_1 = 101 * 001 + 010 = 111$
$X_2 = 101 * 111 + 010 = 100$
$X_3 = 101 * 100 + 010 = 000$
$X_4 = 101 * 000 + 010 = 010$
$X_5 = 101 * 010 + 010 = 011$
$X_6 = 101 * 011 + 010 = 110$
$X_7 = 101 * 110 + 010 = 001$

Figure 2

$X_1 = 101 * 001^{-1} + 010 \pmod{1011} = 101 * 001 + 010 \pmod{1011} = 111$
$X_2 = 101 * 111^{-1} + 010 \pmod{1011} = 101 * 100 + 010 \pmod{1011} = 000$
$X_3 = 101 * 000^{-1} + 010 \pmod{1011} = 101 * 000 + 010 \pmod{1011} = 010$
$X_4 = 101 * 010^{-1} + 010 \pmod{1011} = 101 * 101 + 010 \pmod{1011} = 101$
$X_5 = 101 * 101^{-1} + 010 \pmod{1011} = 101 * 010 + 010 \pmod{1011} = 011$
$X_6 = 101 * 011^{-1} + 010 \pmod{1011} = 101 * 110 + 010 \pmod{1011} = 001$

Figure 3

MECHANISM FOR GENERATING PSEUDORANDOM NUMBER SEQUENCES

TECHNICAL FIELD

The embodiments of the invention relate generally to random number generation and, more specifically, relate to a mechanism for generating pseudorandom number sequences.

BACKGROUND

A pseudorandom number generator (PRNG) is an algorithm to generate a sequence of numbers that approximate the properties of random numbers. The sequence is not truly random in that it is completely determined by a relatively small set of initial values, called the PRNG's state. PRNGs are important in practice for simulations, and particularly central in the practice of cryptography.

A linear congruential generator is one of the earliest and best known pseudorandom number generator algorithms. The generator is defined by the recurrence relationship: $X_{i+1} = (aX_i+c)$ mod p, where $X_i$ is the sequence of random values, p is the modulus, a is the multiplier, c is the increment, and $X_0$ is the seed value. While linear congruential generators are capable of producing decent pseudorandom numbers, they are extremely sensitive to the choice of c, m, and a. In addition, they should not be used in applications where high quality randomness is crucial, such as cryptographic applications.

An inverse congruential generator is a type of nonlinear congruential pseudorandom number generator, which uses the modular multiplicative inverse to generate the next number in a sequence. Inverse congruential generators do a better job at providing high quality randomness than linear congruential generators. The standard formula for an inverse congruential generator is: $X_{i+1}=(aX_i^{-1}+c)$ (mod p).

Another pseudorandom number generator is the multiply-with-carry (MWC) generator. The MWC generator is similar to the linear congruential generator, except that the formula has two evolving values, instead of one evolving value (i.e., the $X_i$ sequence) with the linear congruential generator. In a MWC generator, the c value also evolves in addition to the $X_i$ value. The formulas used for the generator are as follows: $X_{i+1}=(aX_i+c_i)$ mod p; and $c_{i+1}=(aX_i+c_i-X_{i+1})/p$. The MWC generator provides more unpredictability to the recurrence relationship due to the changing carry value affecting the cycle length. It may also be extended by using the multiplicative inverse of the inverse congruential generator in the MWC formula.

A variation of the MWC generator expands the generator to a lag-r implementation, with the recurrence equations as follows: $X_{i+1}=(aX_{i-r}+c_i)$ mod p; $c_{i+1}=(aX_i+c_i-X_{i+1})/p$, where r is the defined lag for the variation. Again, this expansion provides a different level of unpredictability to the recurrence relationship.

The above generators all provide for varying degrees of randomness in a pseudorandom number generator. However, they all operate over integers. This limitation presents difficulties when implementing the above formulas in a hardware environment. In a resource-constrained environment, computing these formulas over integers may not be as efficient as would be desirable. As such, a mechanism to generate pseudorandom bit sequences while accounting for hardware processing power and capacity would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is an exemplary linear congruential generator operation over $GF(2^n)$ according to one embodiment of the invention;

FIG. 3 is an exemplary inverse congruential generator operation over $GF(2^n)$ according to one embodiment of the invention.

DETAILED DESCRIPTION

Figure 1:
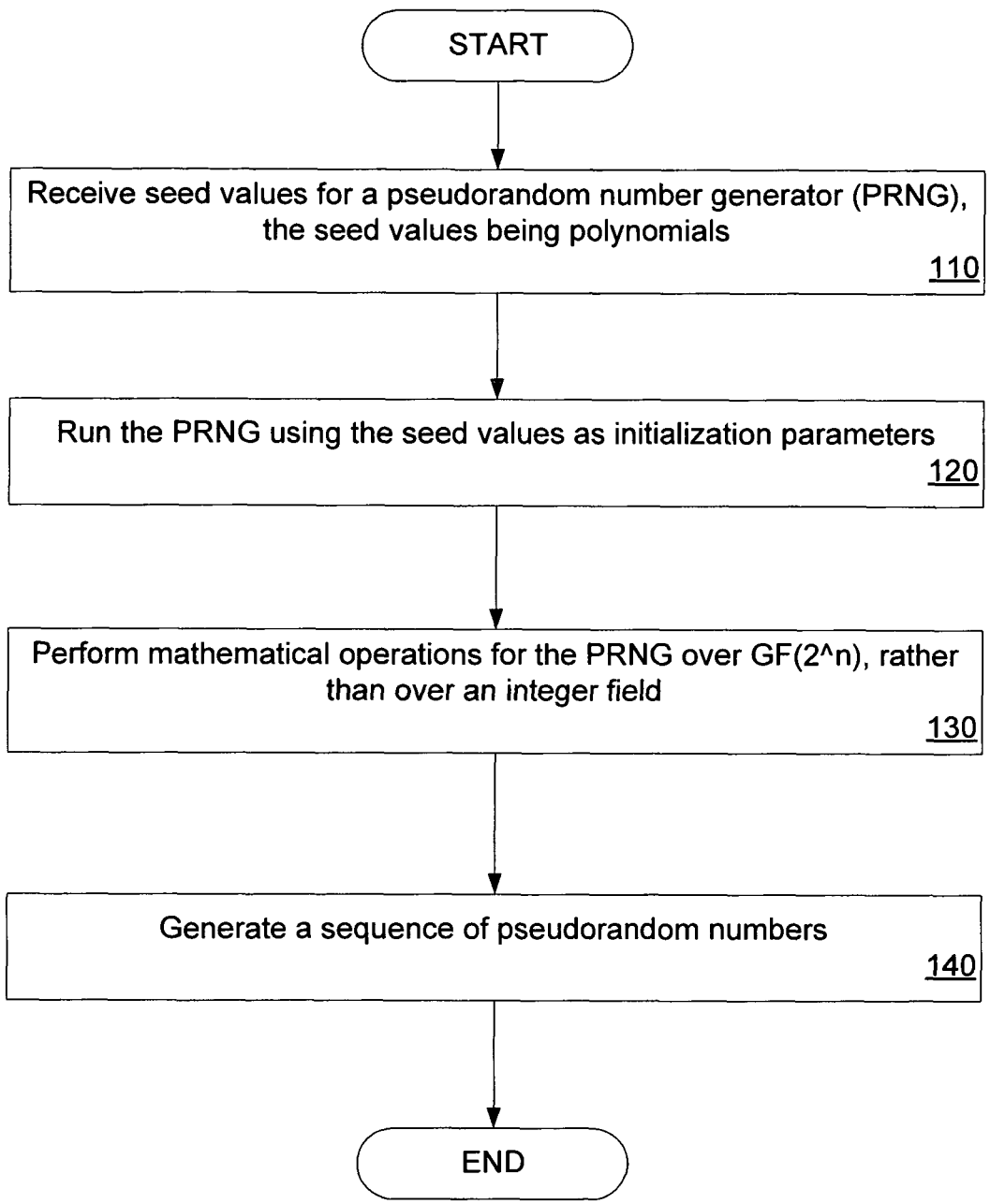
FIG. 1 is a flow diagram illustrating a pseudorandom number generator operating over $GF(2^n)$ according to one embodiment of the invention.

Embodiments of the invention provide for a mechanism for generating pseudo-random number sequences. In one embodiment, a method of generating pseudo-random number sequences includes receiving seed values for a pseudorandom number generator (PRNG) in a computing system, the seed values being polynomials. The method further includes running the PRNG using the seed values as initialization parameters, the running including performing operations of the PRNG over $GF(2^n)$, and generating a sequence of pseudorandom numbers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide for generating a pseudorandom number sequence by running a pseudorandom number generator (PRNG) using mathematical operations over $GF(2^n)$, rather than using mathematical operations over the integers. The following background description is helpful in understanding and laying a foundation for embodiments of the invention.

As previously discussed, an ordinary linear congruential generator takes this form: $X_i+1=aX_i+c \pmod p$, where a, c, p, and $X_0$ are given assigned parameters. For example, with a=5, c=3, p=8, $X_0=1$, the recurrence relation evolves like this:

$X_1=5*1+3(\bmod 8)=8(\bmod 8)=0$ $X_2=5*0+3(\bmod 8)=3(\bmod 8)=3$ $X_3=5*3+3(\bmod 8)=18(\bmod 8)=2$ $X_4=5*2+3(\bmod 8)=13(\bmod 8)=5$ $X_5=5*5+3(\bmod 8)=28(\bmod 8)=4$ $X_6=5*4+3(\bmod 8)=23(\bmod 8)=7$ $X_7=5*7+3(\bmod 8)=38(\bmod 8)=6$ $X_8=5*6+3(\bmod 8)=33(\bmod 8)=1$ An inverse congruential generator works the same way, except that it takes the multiplicative inverse of X before doing the multiplication. As mentioned previously, the inverse congruential generator takes this form: $X_{i+1}=(aX_i^{-1}+c) \pmod p$. As numbers only have multiplicative inverses modulus p if they are co-prime with p, a prime number is used for p in the following example. Also, assume that 0 is the inverse of zero. With assigned parameters a=4, c=5, p=7, $X_0=1$, the recurrence relation evolves as follows:

$X_1=4*1^{-1}+5(\bmod 7)=4*1+5=9(\bmod 7)=2$ $X_2=4*2^{-1}+5(\bmod 7)=4*4+5=21(\bmod 7)=0$ $X_3=4*0^{-1}+5(\bmod 7)=4*0+5=5(\bmod 7)=5$ $X_4=4*5^{-1}+5(\bmod 7)=4*3+5=17(\bmod 7)=3$ $X_5=4*3^{-1}+5(\bmod 7)=4*5+5=25(\bmod 7)=4$ $X_6=4*4^{-1}+5(\bmod 7)=4*2+5=13(\bmod 7)=6$ $X_7=4*6^{-1}+5(\bmod 7)=4*6+5=29(\bmod 7)=1$ Another example PRNG, a multiply-with-carry (MWC) generator, uses two variables, instead of just the X values. Parameters are assigned to the values a and p, and the generator begins with arbitrary c and X values. Then, the MWC generator recurrence relations evolve as follows:

$X_{i+1}=a*X_i+c_i(\bmod p)$ $c_{i+1}=(a*X_i+c_i-X_{i+1})/p$.

In an actual implementation, $a*X_i+c_i$ would be computed and then an operation would be used that gives both the remainder and the quotient when divided by p. If p happens to be a power of 2, the values may be obtained by shifting and masking. For example, if p is 65536, the value of $X_{i+1}$ may be obtained from the result of $a*X_i+c_i$ by applying a binary AND of the result with 65535. The value of $c_{i+1}$ would be attained by shifting left 16 bits.

In some cases, the MWC generator has been expanded to a lag-r MWC generator. The recurrence equations for the MWC lag-r version are as follows:

$X_i=a*X_{i-r}+c_{i-1}(\bmod p)$ $c_i=(a*X_{i-r}+c_{i-1}-X_i)/p$ or, $c_i$ may be computed equivalently as $c_i=\mathrm{floor}((a*X_{-2}+c_0)/p)$. In this case, $c_i$ may be calculated as a by-product of calculating the remainder that gets assigned to Xi (the same as the regular MWC implementation). It is just the integer part of dividing $a*X_{i-r}+c_{i-1}$ by p.

In one example, using the parameters a=5, p=7, $X_{-2}=1$, $X_{-1}=2$, $X_0=3$, $c_0=4$, and r=3, the MWC generator sequence evolves as follows:

$X_1=5*1+4(\bmod 7)=9(\bmod 7)=2$ $c_1=(5*1+4-2)/7=1$ (or, $c_1=\mathrm{floor}((5*1+4)/7)=1$)

$X_2=5*2+1(\bmod 7)=11(\bmod 7)=4$ $c_2=\mathrm{floor}(11/7)=1$ $X_3=5*3+1(\bmod 7)=16(\bmod 7)=2$ $c_3=\mathrm{floor}(16/7)=2$ $X_4=5*2+2(\bmod 7)=12(\bmod 7)=5$ $c_4=\mathrm{floor}(12/7)=1$ $X_5=5*4+1(\bmod 7)=21(\bmod 7)=0$ $c_5$=floor(21/7)=3

$X_6$=5*2+3(mod 7)=13(mod 7)=6

$c_6$=floor(13/7)=1

$X_7$=5*5+1(mod 7)=26(mod 7)=5

$c_7$=floor(26/7)=3

$X_8$=5*0+3(mod 7)=3(mod 7)=3

$c_8$=floor(3/7)=0

$X_9$=5*6+0(mod 7)=30(mod 7)=2

$c_9$=floor(30/7)=4

Embodiments of the invention take the above described PRNGs and extend them to the field of $GF(2^n)$, with the recurrence parameter p being a primitive polynomial over $GF(2^n)$ as well as the other parameters also being polynomials. Such an extension provides easier hardware implementation, which eases processing capacity and speed requirements for the hardware.

The field of $GF(2^n)$ is a Galois Field (also known as a finite field), which is a concept that should be understood by one skilled in the art. A Galois Field is a field that contains a finite number of elements. Specifically, $GF(2^n)$ is a finite field with a number of elements being equal to a power of 2. The field is an abstraction of the rational numbers, with elements in the field corresponding to rational numbers.

For the field of $GF(2^n)$ utilized in embodiments of the invention, the basis field is GF(2), which is the binary numbers 0 and 1. In this case, the operation of addition is the same as a binary XOR operation and the operation of multiplication is the same as a binary AND operation. To extend GF(2) to $GF(2^n)$, a primitive polynomial over the basis field GF(2) of degree n should be found. The primitive polynomial defines multiplication over the field.

FIG. 1 is a flow diagram illustrating a method 100 for a PRNG to operate over $GF(2^n)$ according to an embodiment of the invention. Method 100 may be performed by processing logic that may comprise hardware (e.g., circuitry, dedicated logic, programmable logic, microcode, etc.), software (such as instructions run on a processing device), or a combination thereof. In one embodiment, method 100 may be performed by a PRNG, such as PRNG 450 depicted in FIG. 4.

Method 100 begins at block 110 where seed values are received for a PRNG. These seed values are polynomials. The PRNG may include any of the above described PRNGs, such as a linear congruential generator, an inverse congruential generator, a MWC generator, an MWC lag-r generator, and so on. Then, at block 120, the PRNG is run using the seed values as initialization parameters. At block 130, the PRNG performs mathematical operations for a recurrence equation of the PRNG used to generate pseudorandom numbers over $GF(2^n)$, rather than over integers. Lastly, at block 140, the PRNG generates a sequence of pseudorandom numbers.

In one example highlighting method 100 of FIG. 1, the polynomial $X^3+X+1$ is a primitive polynomial for the $GF(2^3)$ field. To generate the field $GF(2^3)$, a substitution may be made that $X^3$ is equal to $X+1$. This substitution is determined by setting $X^3+X+1=0$, then solving for $X^3$ in your basis field of GF(2). As addition and subtraction are the same thing in the GF(2) basis field, the equation results in $X^3=X+1$.

Then, beginning with the value X in the basis field, the next element in the basis field is squared and get $X^2$. Then multiply by X again to get $X^3$ which is $X+1$, so then $X^3$ is represented as $X+1$. $X^4$ is obtained by multiply X times $X+1$. $X_5$ is X times $X^2+X$ or $X^3+X^2$ or $X+1+X^2$. $X^6$ is equal to X times $X^2+X+1$ or $X^3+X^2+X$, which is $X^2+X+X+1$ or $X^{2+1}$ (because in binary addition 1+1 is 0, so X+X is 0 and goes away). $X^7$ is X times $X^2+1$ which is $X^3+X$ which is $X+X+1$ which is 1, and so on.

In summary, the 8 elements of the $GF(2^3)$ field are:

0
$X^0=1$
$X^1=X$
$X^2=X^2$
$X^3=X+1$
$X^4=X^2+X$
$X^5=X^2+X+1$
$X^6=X^2+1$

The above calculations are simple to compute in hardware and may represent coefficients of polynomials generated with the binary 0s and 1s in particular place locations. For example:

0 represented as 000
$X^0=1$ represented as 001
$X^1=X$ represented as 010
$X^2=X^2$ represented as 100
$X^3=X+1$ represented as 011
$X^4=X^2+X$ represented as 110
$X^5=X^2+X+1$ represented as 111
$X^6=X^2+1$ represented as 101

To perform math over the $GF(2^n)$, a continued look at the above example is helpful. The elements of $GF(2^n)$ can be represented as n-bit strings. Addition of the elements would be done by performing the bitwise XOR of the elements in question (for example, in $GF(2^3)$, 011+110==101).

Multiplication of elements is easiest to perform by interpreting the bit strings as polynomials over GF(2), and using a primitive polynomial of degree n over GF(2) to scale the results. For example, using the primitive polynomial $X^3+X+1$ for $GF(2^3)$, multiplying the elements 011 (==X+1) and 110 (==$X^2+X$) may be accomplished as follows: $(X^2+X)*(X+1)= X^3+X^2+X^2+X=X^3+X$. Taking the remainder of $X3+X$ by $X^3+X+1$ gives a result of 1. In binary form, the operations would look like this:

```
   110
 *011
   110
 +110
 01010
```

Then, taking the remainder (again, in binary):

```
 1010(X^3 + X)
 1011(X^3 + X + 1)
  001
```

FIG. 2 depicts an exemplary set of equations representing a linear congruential generator utilizing operations over $GF(2^n)$ with polynomial parameters, according to one embodiment of the invention. The polynomial parameters include a primitive polynomial of degree n called p, and three other polynomials of degree less than n, called a, c, and $X_0$. The generator would generate a sequence $X_i$, defined by the recurrence relation: $X_i = aX_{i-1} + c \pmod{p}$, where '*' is multiplication over $GF(2^n)$, and '+' is addition over the same field. Simplifying the parameters to binary coefficient representation, the example of FIG. 2 uses p=1011, a=101, c=010, $X_0$=001, and provides the recurrence relation for the linear congruential generation and the elements of the field. As seen, the generator has a period of 7.

According to other embodiments of the invention, to run an inverse congruential generator, for example, over $GF(2^n)$, four parameters are needed: a primitive polynomial of degree n called p, and three other polynomials of degree less than n, called a, c, and $X_0$. The polynomials a and c should be co-prime. The generator would generate a sequence X, defined by the recurrence relation: $X_i = a*X_{i-1}^{-1} + c \pmod{p}$, where '*' is multiplication over $GF(2^n)$, and '+' is addition over the same field. The multiplicative inverse of the various X values is used in the multiplication step.

FIG. 3 depicts an exemplary set of equations representing an inverse congruential generator using the $GF(2^n)$ field according to one embodiment of the invention. Simplifying the parameters to binary coefficient representation, the example of FIG. 3 uses p=1011, a=101, c=010, $X_0$=001, and provides the recurrence relation for the inverse congruential generation and the elements of the field.

In another embodiment of the invention, a combination of the inverse congruential generator and the lag-r MWC generator (known as an inverse lag-r MWC generator) may be made by using a set of seed X values and a starting c value, and calculating: $X_i = a*X_{i-r}^{-1} + c_{i-1} \pmod{p}$ and $c_i = (a*X_{i-r}^{-1} + c_{i-1} - X_i)/p$. The value "r" in the recurrence is the number of seed values.

For example, with the seed values a=5, p=7, $X_{-2}$=1, $X_{-1}$=2, $X_0$=3, and $c_0$=4, the recurrence relation of this inverse lag-r MWC generator becomes:

$$X_1 = 5*1^{-1} + 4 \pmod 7 = 5*1 + 4 = 9 \pmod 7 = 2$$

$$c_1 = (9-2)/7 = 1$$

$$X_2 = 5*2^{-1} + 1 \pmod 7 = 5*4 + 1 = 21 \pmod 7 = 0$$

$$c_2 = (21-0)/7 = 3$$

$$X_3 = 5*3^{-1} + 3 \pmod 7 = 5*5 + 3 = 28 \pmod 7 = 0$$

$$c_3 = (28-0)/7 = 4$$

$$X_4 = 5*2^{-1} + 4 \pmod 7 = 5*4 + 4 = 24 \pmod 7 = 3$$

$$c_4 = (24-3)/7 = 3$$

$$X_5 = 5*0^{-1} + 3 \pmod 7 = 5*0 + 3 = 3 \pmod 7 = 3$$

$$c_5 = (3-3)/7 = 0$$

$$X_6 = 5*0^{-1} + 0 \pmod 7 = 5*0 + 0 = 0 \pmod 7 = 0$$

$$c_6 = (0-0)/7 = 0$$

$$X_7 = 5*3^{-1} + 0 \pmod 7 = 5*5 + 0 = 25 \pmod 7 = 4$$

$$c_7 = (25-4)/7 = 3$$

In another embodiment, the inverse lag-r MWC generator generalization described above may be extended to the $GF(2^n)$ field, similar to the other PRNGs described above with respect to the various embodiments of the invention.

Figure 4:
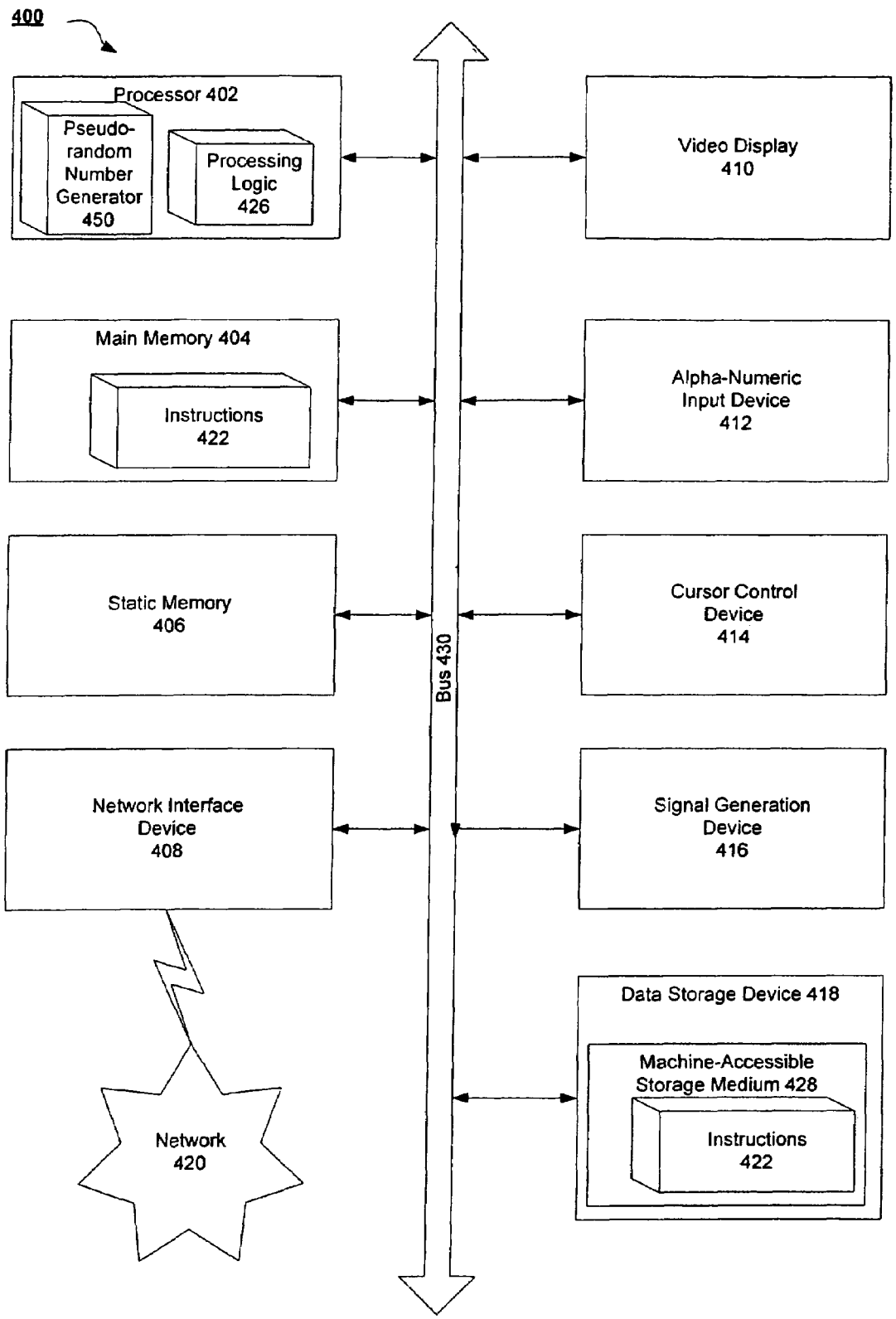
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein. In one embodiment, the processing device 402 may include a pseudorandom number generator 450 that performs the above-described embodiments of the invention.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions for pseudorandom number generator 450 to perform the above described embodiments of the invention, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
   receiving a plurality of polynomials for a pseudorandom number generator (PRNG), wherein the PRNG uses a recurrence relation and wherein the recurrence relation uses multiple initialization parameters; and
   increasing the randomness of the PRNG by running the PRNG using the plurality of polynomials as values for the multiple initialization parameters, the running comprising:
      performing operations of the PRNG over GF(2^n), wherein each polynomial of the plurality of polynomial values has a degree less than or equal to n; and
      generating a sequence of pseudorandom numbers.

2. The method of claim 1, wherein one of the plurality of polynomials comprises a polynomial value, p, wherein p is a primitive polynomial.

3. The method of claim 1, wherein the plurality of polynomials comprise polynomial values, a and c, wherein a and c are co-prime with each other.

4. The method of claim 1, wherein the PRNG is a linear congruential generator.

5. The method of claim 1, wherein the PRNG is an inverse congruential generator.

6. The method of claim 1, wherein the PRNG is an inverse lag-r multiply-with-carry generator.

7. The method of claim 1, wherein the plurality of polynomials are represented by one or more binary 0s and binary 1s in place of terms in the polynomials.

8. The method of claim 7, wherein the sequence of generated pseudorandom numbers are represented as binary numbers that are utilized by the computing system.

9. A system, comprising:
   a processing device;
   a memory communicably coupled to the processing device to store a plurality of polynomials; and
   a pseudorandom number generator (PRNG) communicably coupled to the processing device and the memory, wherein the PRNG uses a recurrence relation and wherein the recurrence relation uses multiple initialization parameters, the PRNG operable to:
      receive the plurality of polynomials;
      increase the randomness of the PRNG by performing operations of the PRNG over GF(2^n) using the plurality of polynomials as values for the multiple initialization parameters, wherein each polynomial of the plurality of polynomial values has a degree less than or equal to n; and
      generate a sequence of pseudorandom numbers.

10. The system of claim 9, wherein one of the plurality of polynomials comprises a polynomial value, p, wherein p is a primitive polynomial.

11. The system of claim 9, wherein the plurality of polynomials comprise polynomial values, a and c, wherein a and c are co-prime with each other.

12. The system of claim 9, wherein the PRNG is at least one of a linear congruential generator, an inverse congruential generator, and an inverse lag-r multiply-with-carry generator.

13. The system of claim 9, wherein the plurality of polynomials are represented by one or more binary 0s and binary 1s in place of terms in the plurality of polynomials.

14. The system of claim 13, wherein the sequence of pseudorandom numbers are represented as binary numbers that are utilized by the computing system.

15. A non-transitory machine-readable storage medium including data that, when accessed by a machine, cause the machine to perform operations comprising:
   receiving a plurality of polynomials for a pseudorandom number generator (PRNG), wherein the PRNG uses a recurrence relation and wherein the recurrence relation uses multiple initialization parameters; and
   increasing the randomness of the PRNG by running the PRNG using the plurality of polynomials as values for the multiple initialization parameters, the running comprising:
      performing operations of the PRNG over GF(2^n), wherein each polynomial of the plurality of polynomial values has a degree less than or equal to n; and
      generating a sequence of pseudorandom numbers.

16. The non-transitory machine-readable storage medium of claim 15, wherein one of the plurality of polynomials comprises a polynomial value, p, wherein p is a primitive polynomial.

17. The non-transitory machine-readable storage medium of claim 15, wherein the plurality of polynomials comprise polynomial values, a and c, wherein a and c are co-prime with each other.

18. The non-transitory machine-readable storage medium of claim 15, wherein the PRNG is at least one of a linear congruential generator, an inverse congruential generator, and an inverse lag-r multiply-with-carry generator.

19. The non-transitory machine-readable storage medium of claim 15, wherein the polynomials are represented by one or more binary 0s and binary 1s in place of terms in the polynomials.

20. The non-transitory machine-readable storage medium of claim 19, wherein the generated sequence of pseudorandom numbers are represented as binary numbers that are utilized by the computing system.

21. A computer-implemented method, comprising:
   receiving a plurality of polynomials for a pseudorandom number generator (PRNG) in a computing system, wherein the PRNG comprises one of a linear congruential generator, an inverse congruential generator, a multiply-with-carry generator, and an inverse lag-r multiply-with-carry generator; and
   increasing the randomness of the PRNG by running the PRNG using the plurality of polynomials as initialization parameters, the running comprising:
      performing operations of the PRNG over GF(2^n), wherein each polynomial of the plurality of polynomial values has a degree less than or equal to n; and
      generating a sequence of pseudorandom numbers.

* * * * *